US00RE38309E

(19) United States
(12) Reissued Patent
Frazier et al.

(10) Patent Number: US RE38,309 E
(45) Date of Reissued Patent: Nov. 11, 2003

(54) FULL DUPLEX FLOW CONTROL FOR ETHERNET NETWORKS

(75) Inventors: Howard M. Frazier, Pleasanton, CA (US); Shimon Muller, Sunnyvale, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

(21) Appl. No.: 09/616,347

(22) Filed: Jul. 14, 2000

Related U.S. Patent Documents

Reissue of:
(64) Patent No.: 5,784,559
Issued: Jul. 21, 1998
Appl. No.: 08/554,097
Filed: Nov. 6, 1995

(51) Int. Cl.[7] ..... H04J 1/16
(52) U.S. Cl. ..... 370/231; 370/282; 709/232
(58) Field of Search ..... 370/335, 336, 370/231, 230, 229, 429, 528, 389, 236, 390, 235, 414, 282; 710/106; 709/235, 232

(56) References Cited

U.S. PATENT DOCUMENTS 4,926,415 A * 5/1990 Tawara ..... 370/231
5,007,051 A * 4/1991 Dolkas ..... 370/235
5,121,382 A * 6/1992 Yang ..... 370/250

(List continued on next page.)

FOREIGN PATENT DOCUMENTS

EP 0310360 * 4/1989
EP 0333225 * 9/1989
EP 0404337 * 12/1990

OTHER PUBLICATIONS

"IEEE Standards for Local Area Networks: Logical Link Control", The Electr. Engs. Inc., pp. 21–76, STD 802.2, Nov. 1988.*

(List continued on next page.)

*Primary Examiner*—Hassan Kizou
*Assistant Examiner*—John Pezzlo
(74) *Attorney, Agent, or Firm*—Park, Vaughan & Fleming LLP

(57) ABSTRACT

CSMA/CD is used to implement flow control in a full-duplex Ethernet network in a lossless fashion. Uniquely identifiable flow control transmit on/off ("XON/XOFF") messages are transmitted, preferably during IPG, by a receiving station about to be congested to the transmitting station whose data output is to be controlled. The transmitting station physical layer receives and decodes these messages. If XOFF is recognized, the transmitting station continuously asserts CRS to its MAC layer at the MII, regardless of the prior CRS current state. CRS is continuously asserted until the receiving station transmits an XON flow control signal, indicating its ability to accept further data. During CRS assertion, the transmitting station defers transmission, e.g., is flow controlled. The MAC layer is slightly modified (but is still backward compatible with half-duplex networks) to provide separate transmit deferral receive data frame mechanisms using separate and independent input status signals, namely CRS and RX_DV. CRS provides a carrierSense signal used for deferral within the MAC transmit process, and RX_DV provides a receive_carrierSense signal that frames data within the MAC receive process. As long as CRS remains asserted, the transmitting station defers transmission, thereby implementing flow control. In addition to slight MAC layer modification, the present invention slightly modified the physical layer, MII interface and reconciliation sublayer.

29 Claims, 10 Drawing Sheets

U.S. PATENT DOCUMENTS

| | | | | | |
|---|---|---|---|---|---|
| 5,140,679 | A | * | 8/1992 | Michael | 710/106 |
| 5,313,582 | A | * | 5/1994 | Hendel | 395/250 |
| 5,381,413 | A | | 1/1995 | Tobagi et al. | 370/448 |
| 5,404,353 | A | * | 4/1995 | Ben-Michael | 370/235 |
| 5,418,784 | A | * | 5/1995 | Ramakrishnan | 370/445 |
| 5,526,355 | A | * | 6/1996 | Yang | 370/448 |
| 5,541,957 | A | * | 7/1996 | Lau | 375/258 |
| 5,577,069 | A | * | 11/1996 | Lau | 375/242 |
| 5,673,254 | A | * | 9/1997 | Crayford | 370/231 |
| 5,793,748 | A | * | 8/1998 | Murase | 370/235 |
| 5,978,359 | A | * | 11/1999 | Caldara et al. | 370/236 |
| 5,982,776 | A | * | 11/1999 | Manning et al. | 370/414 |
| 6,029,202 | A | * | 2/2000 | Frazier et al. | 709/232 |

OTHER PUBLICATIONS

Somer, G., "Ethernet Transceiver Offers Upgrade from Existing Networks", Electronic Engineering, vol. 67:No.820:25–30, Apr. 1995.*

Tanenbaum, A.S., "Computer Networks", Prentice–Hall Intl. Inc., Sec. 1.4:14–19; Sec. 3.4:141–147; and Sec. 4.4:223–225, Mar. 1993.*

"22. Reconciliation Sublayer (RS) and Media Independent Interface (MII)", IEEE, Std 802.3u, pp. 37–80, Nov. 1988.*

IEEE Standards Board, *IEEE Std 802. 3u–1995, IEEE Standards for Local and Metropolitan Networks: Supplement to Carrier Sense Multiple Access with Collision Detection (CSMA/CD) Access Method and Physical Layer Specifications; Media Access Control (MAC) Parameters, Physical Layer, Medium Attachment Units, and Repeater for 100 MB/s Operation, Type 100BASE–T (Clauses 21–30)*, The Institute of Electrical and Electronics Engineers, Inc., pp. 36–60, New York, NY, Jun. 1995.

* cited by examiner

FULL DUPLEX FLOW CONTROL FOR ETHERNET NETWORKS

Matter enclosed in heavy brackets [ ] appears in the original patent but forms no part of this reissue specification; matter printed in italics indicates the additions made by reissue.

FIELD OF THE INVENTION

This invention relates to networks in general including Ethernet networks, and more specifically to implementing an Ethernet network having full duplex flow control.

BACKGROUND OF THE INVENTION

A network is a communications facility that permits a number of workstations, computers or other equipment (hereinafter collectively "computer(s)") to communicate with each other. Portions of a network involve hardware and software, for example, the computers or stations (which individually may comprise one or more central processing units, random access and persistent memory), the interface components, the cable or fiber optics used to connect them, as well as software that governs the access to and flow of information over the network. In networks in which data flow is 100 Mbits/sec. ("Mbps") or higher, the transmission medium is often fiber optics. In networks in which a slower data rate is acceptable, e.g., 10 Mbps, the transmission medium may be coaxial cable or, as is often the case for an Ethernet network, twisted wires.

In a network, network architecture defines protocols, message formats and other standards to which the computers and other equipment, and software must adhere. Most network architectures have adopted a model comprising functional layers in which a given layer is responsible for performing a specific set of functions, and for providing a specific set of services. Thus, the services provided by each layer and the interlayer interfaces can define a network architecture. Protocols define the services covered across a layer interface and the rules followed in the processing performed as a part of that service. organizations have proposed models and standards that have been accepted within the networking community. The International Standards Organization ("ISO"), for example, has proposed a seven layer reference model for computer networking that is called the open systems interconnect ("OSI") architecture. Another set of standards has been promulgated by the Institute of Electrical and Electronics Engineers ("IEEE") set of proposed local area network ("LAN") standards known as IEEE Project 802. This model conforms to the seven-layer OSI model, but directly solely to the lowest two OSI layers, namely the physical layer and the data link layer.

FIG. 1 depicts a network according to the IEEE Project 802 modification to the ISO seven layer model, in which two computers 10, 10' are can communicate data to each other over a physical link medium 20, e.g., cable. Of course, in practice, a network may have many hundreds of computers rather than two.

The bottommost layer 30 in both the ISO and Project 802 model is a physical layer that is concerned with connections between two machines (e.g., computers 10, 10') to allow transmission of bit streams over a physical transmission medium (e.g., cable 20). Thus, physical layer 30 is concerned with types of cabling, cable plugs, connectors, and the like.

As will be described shortly, the present invention is directed to Ethernet networks adhering to the carrier sense multiple access with collision detection ("CSMA/CD") standard. In the 802 model for CSMA/CD, a reconciliation interface 40 defined by a Media Independent Interface ("MII") standard exists for the reconciliation sublayer 40 interface between physical layer 30 and a media access control ("MAC") sublayer 50B. The existing MII signal set provides independent four bit-wide paths for transmission and reception of data, and includes specific "hooks" for link level data flow control. (As used herein, flow control refers to inhibiting access to a network, or one or more links within the network.)

Interestingly, before adoption of MII, the MAC standard defined a single carrier sense signal ("CRS") from the physical layer to the MAC that the MAC used to describe the state of the transmit and receive medium. This one CRS signal was used by the MAC transmit process to implement deferral of data transmission, and was by the MAC receive process to frame received data. With introduction of MII, this one CRS signal was decoupled into a CRS signal that again went to the MAC transmit process to implement deferral of data transmission, and into a receive data valid ("RX_DV") signal that went to the MAC receive process. Thus, with MII, CRS is used solely by the MAC transmit process.

Under MII, data and delimiters are synchronous to the corresponding clock, and two asynchronous media status signals are provided, namely carrier sense ("CRS"), and collision ("COL"). MII provides a two wire serial management interface for control and status gathering, namely management data clock ("MDC"), and management data input/output ("MDIO"). In the OSI seven-layer model, the layer above the physical layer is a data link layer that is responsible for error-free transmission of data frames between network nodes. A data link control protocol describes operation and interfaces of this layer, which must also shield higher layers in the model from concerns about the physical transmission medium.

But in the 802 model shown in FIG. 1, the data link layer is subdivided into MAC layer 50B and an overlying logical link control ("LLC") layer 50A. The media access control sublayer is concerned with access control methods to determine how to control the use of the physical transmission medium. The LLC sublayer 50A is responsible for medium-independent data link functions and allows the network layer 60 above to access LAN services independently of how the network is implemented. According to the 802 architecture, LLC sublayer 50A provides services to network 60 in the same fashion as would a conventional data link protocol in a wide area network.

The MAC sublayer 50B provides services to the overlying LLC sublayer 50A, and manages sharing of the transmission medium among the different stations on the network. A media access management function receives a frame from the data encapsulation function after the necessary control information has been added. Thereafter, media access management is responsible for ensuring physical transmission of the data. The data frame in an Ethernet full-duplex environment has a maximum size of 1,518 bytes.

Several 802 standards exist for MAC sublayer 50B, but only the carrier sense multiple access with collision detection ("CSMA/CD") standard is relevant to the present invention, more specifically the 802.3 standard. The existing 802.3 MAC standard presently contains several mechanisms for performing flow control in a half-duplex environment, including a Deference process, and WatchForCollission and BackOff procedures. CSMA/CD defines data encapsulation/ decapsulation and media access management functions performed by MAC sublayer 50B itself, the data encoding/decoding function being performed by underlying physical layer 30.

Physical transmission of the data may be ensured using carrier sensing to defer transmission until the network is clear. In brief, a transmitting station (e.g., computer or user 10) listens or monitors the transmission medium (e.g., cable 20) before transmitting to determine whether another station (e.g., computer or user 10') is currently transmitting a message, e.g., to learn whether the medium is free. Using the services of the physical layer 30, the media access management determines whether the transmission medium (or carrier) is presently being used. If the medium is not being used, media access management passes the data frame to physical layer 30 for transmission. Even after transmission of the frame has begun media access management continues to monitor the carrier. If the carrier is busy, media access management continues monitoring until no other stations are transmitting. Media access management then waits a specified random time to allow the network to clear and thereafter begins transmission.

But other station(s) having messages to send may all listen simultaneously, discern that the transmission medium appears quiet, and begin to transmit messages simultaneously. The result is a collision and garbled messages. If signal collision is detected, receiving stations ignore the garbled transmission, transmitting stations stop transmitting messages immediately and transmit a jamming signal over the medium. Following collision, each transmitting station will attempt to re-transmit after waiting for a random backoff-delay time period for the carrier to clear. Thus, a station transmitting must listen sufficiently long to ensure that collision has not occurred.

In FIG. 1, network layer 60 concerns the routing of data from one network node to another. It is the role of network layer 60 to route data between network nodes.

Transport layer 70 provides data transfer between two stations at an agreed upon level of quality once a connection is established between the stations. Transport layer 70 selects the particular class of service to be used, monitors transmission to ensure maintained service quality, and advises the stations (or users) if quality cannot be maintained.

Session layer 80 provides services that organize and synchronize a dialogue occurring between stations, and manages data exchange between stations. As such, session layer 80 controls when stations can send and receive data, based upon whether they can send and receive concurrently or alternately.

Presentation layer 90 ensures that information is presented to network users meaningfully, and may provide character code translation services, data conversion, data compression and expansion services.

Application layer 100 provides a mechanism for application processes to access system interconnection facilities for information exchange. The application layer provides services used to establish and terminate inter-user connections, and to monitor and manage the interconnected systems and the resources they employ.

Those skilled in the art will appreciate that the network shown in FIG. 1 may be half-duplex (or shared), or full-duplex. In half-duplex, there is a single shared communications path, and at any given time a station can transmit and monitor, or can receive, but can never simultaneously transmit and receive. In a half-duplex environment, MAC layer 50B uses a CSMA/CD algorithm, e.g., IEEE 802.3, such that a station desiring to use the network to transmit must first listen to learn whether the network is busy. If busy, the station desiring to transmit defers transmission but continues to monitor medium status while waiting for the network to become idle. If idle, the station can begin transmitting. While transmitting, the station continues to monitor the network to ensure that another station does not also begin to transmit at the same time, or transmit in an overlapping fashion, e.g., to ensure there is no collision. Similarly, when a station receives data, it is inhibited from simultaneously transmitting.

As such, the CSMA/CD algorithm provides a useful pacing mechanism that will inhibit or defer access of arrival new data into the half-duplex network until the network is adequately prepared. In addition, a so-called backpressure algorithm is also used in half-duplex environments to inhibit a station from sending data into the network by transmitting to that station. Receipt of the transmission causes the would be transmitting station to believe the network is busy, and to defer or inhibit transmission.

By contrast, in full-duplex, there are transmit and a receive communications paths, and one or more stations may transmit and receive simultaneously. The dual communications channel or path may in fact be multiple wires or cables, or a single wire or cable that simultaneously carries transmit and receive signals in both directions, perhaps using frequency division. Full-duplex networks can provide a higher data rate than half-duplex networks, often 100 Mbps, and are often preferred because of the more rapid communication rate.

Unfortunately, in going to a full-duplex environment, the IEEE 802.3 CSMA/CD MAC half-duplex mechanisms for collision avoidance and for transmission deferral must be abandoned. In a full-duplex environment, a transmitting station that in a half-duplex network would be subject to flow control is permitted to transmit at the same time a receiving station can transmit. The concept of "collisions" or avoiding collisions is meaningless in a full-duplex environment. Further, since a station desiring to transmit over a full-duplex network does not monitor the medium, half-duplex deferral and backpressure flow control procedures are also useless. Thus, the various half-duplex CSMA/CD data pacing mechanisms cannot be used in full-duplex to control or limit access to the network. However, a full-duplex network nonetheless needs some mechanism to inhibit a station from transmitting.

The need for flow control arises because a full-duplex network contains resources that are finite. Networks include devices such as switches, routers, bridges, etc. that connect two network segments together and move data between the segments. These devices typically include buffer memory to accommodate data rate adaptation between links carrying signals at different rates, e.g., perhaps 100 Mbps incoming data presented to a network link capable of handling only 10 Mbps, or to otherwise function when other resources are occupied. While such devices can temporarily store rapidly arriving data during a slower read-out, device memories can readily fill and congest unless some mechanism can halt or slow the entry of new data into the network, or at least the link including the congested device. (While half-duplex networks can also have links with different data rates, the problem is aggravated in full-duplex networks in which considerably more data flows, especially at 100 Mbps.)

Unfortunately, in the prior art there is no flow control mechanism for full-duplex Ethernet networks that avoid such data congestion and resultant data loss, without sacrificing data throughput. Flow control devices implemented in full-duplex networks at the transport layer are slow and inefficient. Transport layer mechanisms can detect a data congestion condition and slow transmission rates. Unfortunately, data throughput will be slower than the rate associated with the congested device using such flow control mechanisms. Thus, data output from a 10 Mbps device receiving data at 100 Mbps will be substantially less than the 10 Mbps rate associated with the device.

Thus, there is a need for a flow control mechanism for a full-duplex Ethernet network. Preferably such mechanism should provide CSMA/CD collision and deferral access to a full-duplex Ethernet network as a flow control method, while maintaining back compatibility with existing networks and standards. Such method should sense when a receiving station or device is about to be (or is) congested with data and should temporarily inhibit a transmitting station or device from transmitting new data until the present data can be handled.

To be compatible with existing networks and equipment and software, such flow control should conform to IEEE 802 standards. Further, to promote its wide use, such flow control mechanism should involve only minor modifications to such standards. Such mechanism should control flow such that the data rate from a slow device coupled to a fast device is the data rate capability of the slow device. Further, while flow control should include a "refresh" mode in which flow control signals are sent relatively often, an option for a time-out mechanism should be provided to deactivate flow control in the event a re-activate flow control signal is somehow not received by a transmitting station.

Further, there is a need in a full-duplex Ethernet network for a MAC layer whose transmitter process and receiver process are each responsive to separately and independently generated signals.

The present invention discloses such a flow control mechanism and such a MAC layer for a full-duplex Ethernet network.

SUMMARY OF THE PRESENT INVENTION

The present invention utilizes CSMA/CD to implement flow control in a full-duplex Ethernet network in a lossless fashion, without reliance upon a single signal to describe the state of both the transmitting and receiving process of a station that is to be flow controlled. Flow control transmit on/off ("XON/XOFF") messages are transmitted by a receiving station that is about to be congested, across the physical layer to the transmitting station whose data output is to be controlled. The XON/XOFF signals have a format distinguishable from normal data and preferably are transmitted in the inter-packet gap ("IPG") between data frames as frequently as every IPG. If the receiving station resources can receive at least a frame of additional data, XON is transmitted during the IPG, otherwise XOFF is transmitted. Alternatively, rather than send (e.g., "refresh") XON/XOFF after every single frame, a timer within the transmitting station may be started by receipt of an XOFF, and after expiration of a given time, transmission can re-start even if no XON was received (perhaps due to data corruption). The timer mechanism may be used with a per/IPG refresh control signal to ensure reestablishment of transmission should an XON control signal fail to be received by the flow controlled transmitting station.

At the physical layer of the transmitting station at the other end of the medium, the uniquely formatted flow control messages are received, decoded, and distinguished from each other and from data. If XOFF is recognized, the transmitting station asserts its carrier sense signal (CRS) to its MAC layer at the MII.

The present invention slightly modifies the MAC layer to provide separate and independent transmit deferral receive data frame mechanisms using separate and independent input status signals, namely CRS and RX_DV. Within the slightly modified MAC layer, the CRS signal is used to provide a carrier sense signal that is used to perform a deferral function within the MAC transmit process. Further, when RX_DV is asserted on the MII, MAC receive processing logic accepts and process data from the physical layer, and then passes the processed data to the logical link control layer. However, the modified MAC is fully back-compatible with half-duplex networks.

When threatened congestion is imminent, a receiving station sends XOFF to the physical layer of the transmitting station. Upon receipt of XOFF, the transmitting physical layer asserts CRS at the MII (or other interface), and continues to assert this status signal until XON is received. As long as CRS is asserted, the transmitting MAC will defer data transmission, and is thus flow controlled or inhibited from transmitting onto the network.

When receiving station resources permit accepting additional data, its physical layer emits XON over the medium to the transmitting station, preferably during the IPG during its own data transmission. (The fact that the receiving station may be congested does not affect its ability to transmit in the full-duplex environment.) The originally transmitting station receives and recognized XON, and de-asserts CRS, which permits its MAC to transit.

Preferably the receiving station sends an XOFF signal when it is within a frame or so of being congested. At the transmitting end, if an XOFF is received during frame transmission, XOFF does not take effect until that frame transmission is complete. Thus flow control is lossless, with ± one frame granularity.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
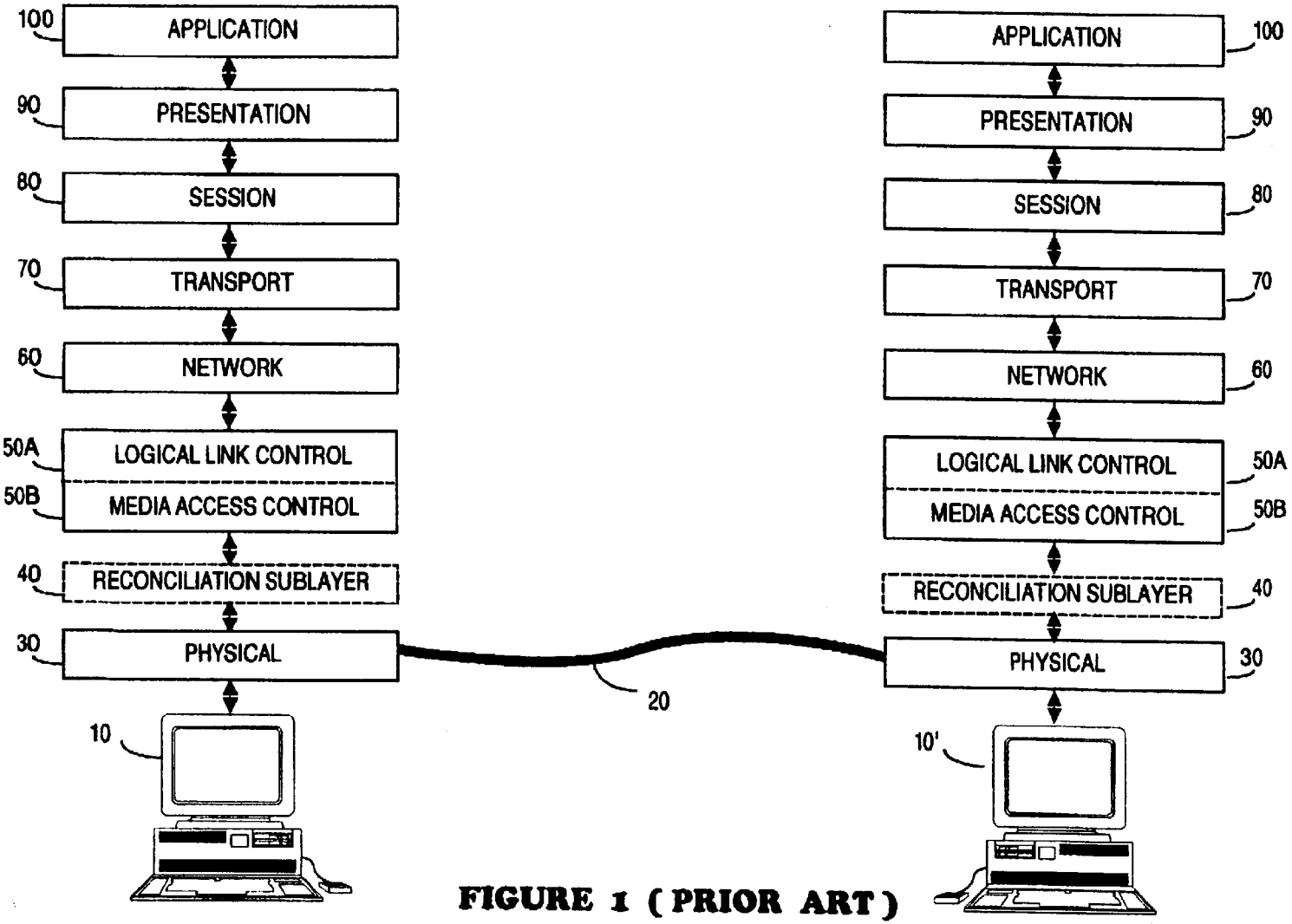
FIGURE 1 (PRIOR ART)
FIG. 1 depicts a network, according to the prior art.
Figure 2:
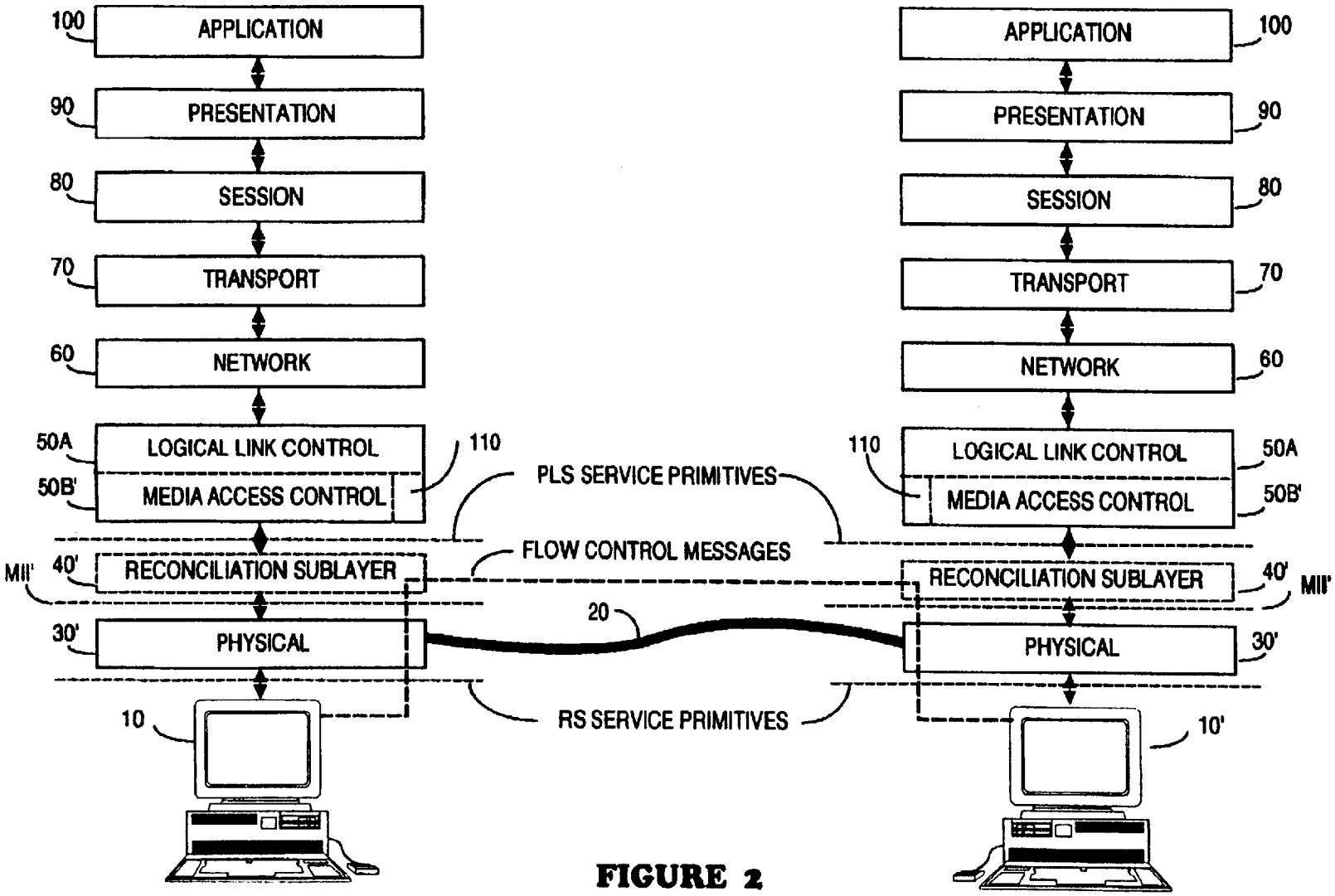
FIG. 2 depicts a full-duplex switching network employing data flow control, according to the present invention.

FIG. 2 depicts a full-duplex switched environment network employing data flow control to prevent packet congestion, according to the present invention. The network of FIG. 2 is in many ways similar to the prior art network of FIG. 1, except that minor changes have been made to the media access control sublayer, here 50B', to the reconciliation sublayer, here 40', to the interface standard, here MII', between the physical layer and the reconciliation sublayer 40', and to the physical layer, here 30'.

It will be appreciated that layers from and including the logical link control layer 50A and upward are unchanged, as are the computers 10, 10' and the interconnecting medium 20. Because only the MAC sublayer 50B', the reconciliation sublayer 40', the MII interface MII' and physical layer 30' are slightly changed, the network is fully IEEE 802 compatible, and is also compatible with the newly promulgated IEEE 802.3u standard. As a result, link level flow control is readily achieved without violating system capability with existing standards, including the 802.3 standard.

According to the present invention, a unit of data terminating equipment ("DTE"), e.g., computer 10, physical layer 30', interface MII', reconciliation sublayer 40', and MAC layer 50B sends an XON or XOFF message to flow control the DTE at the remote end of a link. With reference to FIG. 2, the second DTE might include computer 10' and associated relevant layers 30', 40' 5OB' and interface MII'. As will be described, flow control messages XON/XOFF preferably are transmitted on the data path during the normally at least 96 bit times-wide inter-packet gap ("IPG") period, using a unique pattern of bits to distinguish XON and XOFF from any possible data. However, these flow control signals could instead be transmitted during frames of actual data, although reliability may be impacted as bit error might result in misidentification of a flow control signal. It is important that the transmitting station's physical layer distinguish incoming XON/XOFF (or other flow control messages, e.g., RELEASE) from data, and the flow control messages may use reserved codes, non-data codes, among other code patterns to be distinguished from normal data patterns.

Using the present invention, a DTE may transmit as long as it has not received an XOFF message from the DTE at the far end of the link. Upon receiving such an XOFF message, a DTE must first receive an XON message before it is allowed to transmit. In FIG. 2, the XON and XOFF messages are encoded and decoded by the physical layer 30'. Physical layer 30' responds to an XOFF by forcing an 802.3-compliant MAC layer 50B' to defer until receipt of an XON, or until a time-out occurs. The XON and XOFF messages are transported over the MII' interface via reserved encodings of the data path and delimiter signals. As described herein, the present invention uses the MAC 50B' deference process as a mechanism for lossless full-duplex flow control.

A DTE may initiate transmission of an XON or XOFF message via the following primitive:

RS_FlowControl.request(request_type) request_type:START, STOP

As used herein, the term "primitive" refers to a formal definition of a service interface provided by a model layer. For example, layers in communication with processes are defined by the services the layers provide to other layers and the individual specification of such services are primitives.

A DTE may receive an XON or XOFF message via the following primitive:

RS_FlowControl.indicate(indicate_type) indicate_type:START, STOP

A DTE may recover from a lost XON message via the following primitive:

RS_FlowControl_Release.request()

XON and XOFF messages may be transmitted only during the IPG, or the first half of the preamble.

In the conventional MII signal set independent four bit-wide paths for transmission and reception of data are present, as are specific "hooks" for link level data flow control. The four transmission paths are transmit data or TXD<3:0>, transmit clock or TX_CLK, transmit enable or TX_EN, and transmit error or TX_ER. TX_CLK is generated by the physical layer and is used by the MAC as a data reference clock. TX_CLK runs at 25% of the bit rate on the transmission media, e.g., 25 MHz for a 100 Mbps transmission rate and is continuously active. TX_EN is MAC-provided, and frames or delimits data to be transmitted by the physical layer. TX_EN is asserted into the active state ("1") at the start of a frame transmission, and remains active until de-assertion to logical "0" at end of frame transition. The transmit data TXD is actual frame data from the MAC to the physical layer. The TXD<3:0>nomenclature denotes that the transmit data is a four bit wide bundle. TX_ER is a signal from the MAC to the physical layer advising that contents of the data bundle are not data code, e.g., perhaps corrupted data or XON, XOFF.

The four reception paths are receive data or RXD<3:0>, receive clock or RX_CLK, receive data valid or RX_DV, and receive error or RX_ER. As noted, TX_CLK is continuously active, whereas RX_CLK is continuous active during data reception and an inter-packet gap3A ("IPG"). Within a protocol data unit ("PDU"), data transmission and reception is uninterrupted. As used herein, the notation TXD<3.0> or RXD<3,0> denotes that these signals are a four-bit wide bundle.

The production and handling of messages for the network of FIG. 2 will now be described. An XOFF message is produced by the reconciliation ("RS") sublayer 40' in response to the RS_FlowContrrol.request(STOP)primitive. The XOFF message is conveyed on the MII' signals as follows:

TXD<3:0>=<0111>, TX_EN de-asserted, TX_ER asserted.

An XON message is produced by the RS 40' in response to the RS_FlowControl.request(START) primitive. The XON message is conveyed on the MII' signals as follows:

TXD<3:0>=<1011>, TX_EN de-asserted, TX_ER asserted.

These XON and XOFF messages are conveyed in one TX_CLK period.

Figure 3A:
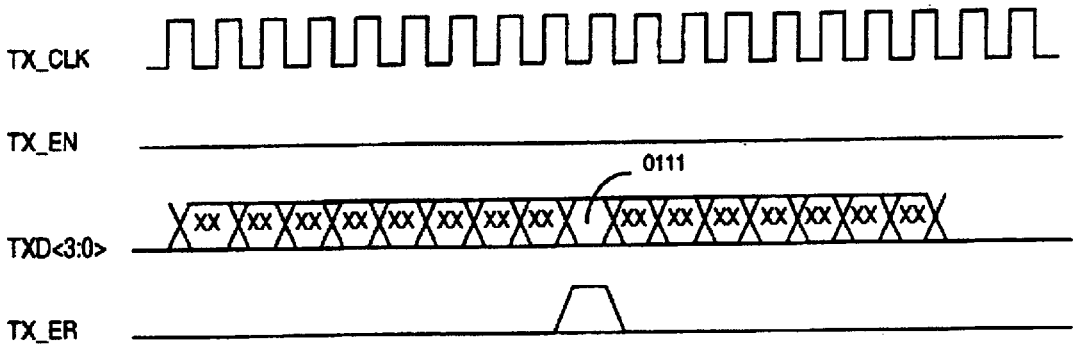
FIG. 3A depicts the spatial relationship between signals associated with transmission of an XOFF message on MII', according to the present invention.

FIG. 3A depicts the spatial relationship between TX_CLK, TX_EN, EXD<3:0>, and TX_ER, with respect to transmission of an XOFF flow control signal from the MAC in the congested station. In FIG. 3A, a presumed unique code "0111" denotes XOFF, e.g., transmit data 3="0", transmit data 2, 1 and 0 are all "1". (The nomenclature "transmit data x" refers to a particular signal in the four-bit data bundle.) The receiving station's MAC provides TX EN, which is "0" as the waveforms shown are occurring during the IPG, and also provides TX_ER from the reconciliation sublayer. The receiving station's MAC will also assert TX_ER for one cycle of TX_CLK while the "0111" pattern is placed on the data bundle to indicate this is a non-data signal. If TX_ER is "1", the occurrence of 0111 in data TXD will look like data, but when TX_EN ="0" and TX_ER ="1", the unique pattern (here 0111) denotes XOFF. The "XX" notation for the data TXD indicates "don't care", since normal data has no meaning during the IPG time.

Figure 3B:
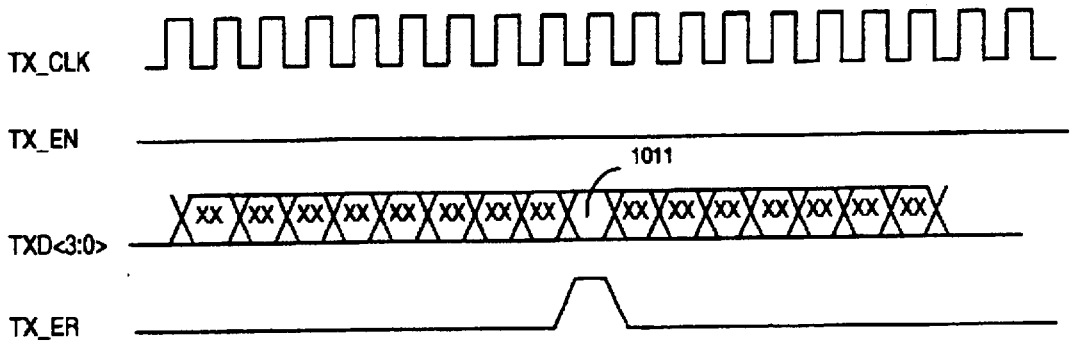
FIG. 3B depicts the spatial relationship between signals associated with transmission of an XON message on MII', according to the present invention.

FIG. 3B depicts the spatial relationship between the same signals for transmission of an XON flow control signal (here denoted as "1011") from the no-longer congested receiving station MAC. TX_EN is "0" because, as noted, XON preferably is transmitted between frames in the IPG. The no longer congested station's MAC provides the 1011 XON signal, which when TX_EN ="0" and EX_ER ="1" denotes XON, and not data.

Figure 3C:
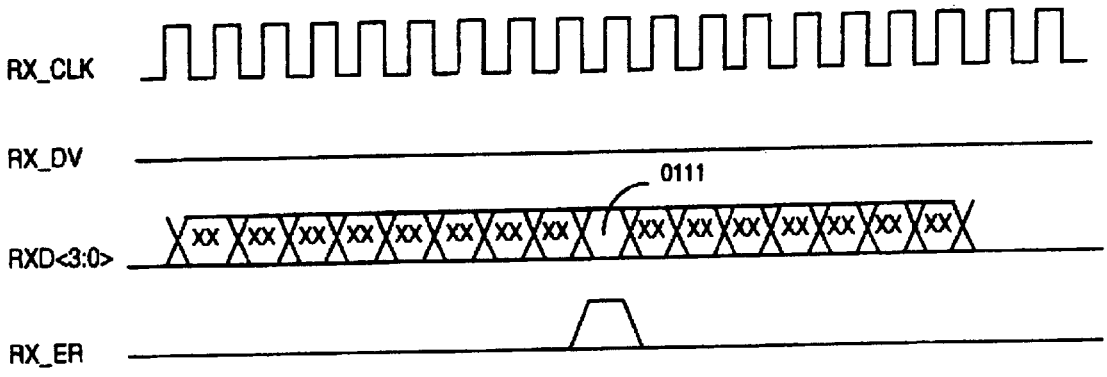
FIG. 3C depicts the spatial relationship between signals associated with reception of an XOFF message on MII', according to the present invention.
Figure 3D:
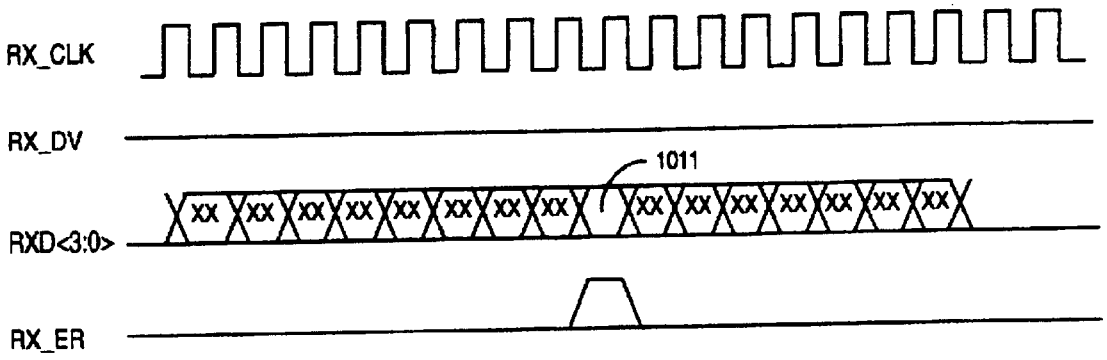
FIG. 3D depicts the spatial relationship between signals associated with reception of an XON message on MII', according to the present invention.

FIG. 3C and FIG. 3D similarly depict reception of an XOFF and an XON message, by the transmitting station whose data output has threatened to congest the receiving station. In FIGS. 3C and 3D, RX_DV ="0" because the various transmitting station's physical layer-generated waveforms shown occur within the IPG, and RX_DV normally remains de-asserted during the IPG. In FIG. 3C, when a flow control message is received during the IPG, RX_DV remains "0", the received data bundle assumes the value, here, "0111" denoting XOFF, and RX_ER is asserted to a "1" state for one cycle of RX_CLK. Similarly, with respect to FIG. 3D, to receive an XON message, RX_DV remains de-asserted, the received data bundle assumes the state, here, "1011" denoting XON, and the normally deactivated RX_ER is raised to "1" for one cycle of RX CLK.

The physical layer 30' sends an XOFF message to the RS 40' when the physical layer received an XOFF from the remote end of the link. The XOFF message is conveyed on the MII' signals as follows:

RXD<3:0>=<0111>, RX_DV de-asserted, RX_ER asserted

The RS generates FS_FlowControl.indicate(STOP) when it receives an XOFF message.

The physical layer sends an XON message to the RS when the physical layer receives an XON from the remote end of the link. The XON message is conveyed on the MII' signals as follows:

RXD<3:0>=<1011>, RX_DV de-asserted, RX_ER asserted

The RS generates RS_FlowControl.indicate(START) when it receives an XON message. The XON and XOFF messages are conveyed in one RX_CLK period.

In a preferred "refresh mode" embodiment, XON or XOR is transmitted by a receiving station preferably during each IPG, although these flow control signals could instead be transmitted with a repetition less than once per IPG. In an alternative "time-out" embodiment, a timer, shown in FIG. 2 as 110, associated with the MAC layer times an interval AT commencing with receipt of an XOFF flow control signal. If after interval ΔT an XON signal has not been received (perhaps due to corruption or other error), the transmitting station's MAC issues a RELEASE signal ("1100" in FIG. 3E) that forces the underlying physical layer to de-assert the CRS signal. The MAC can then transmit, precisely as if an XON signal had been received. Although implementing timer 110 involves some additional cost and hardware, its use can make available many of the IPG periods for use other than for conveying flow control messages. On the other hand, transmitting flow control messages during every IPG is a more robust procedure, but dedicates at least a portion of the IPG period to flow control message transmission.

The RELEASE message is generated by the transmitting station's reconciliation sublayer 40' in response to the RS_FlowControl_Release.request() primitive. The RELEASE message is conveyed on the MII' signals as follows:

TXD<3:0>=<1100>, TX_EN de-asserted, TX_ER asserted.

This RELEASE message is conveyed in one TX_CLK period.

Figure 3E:
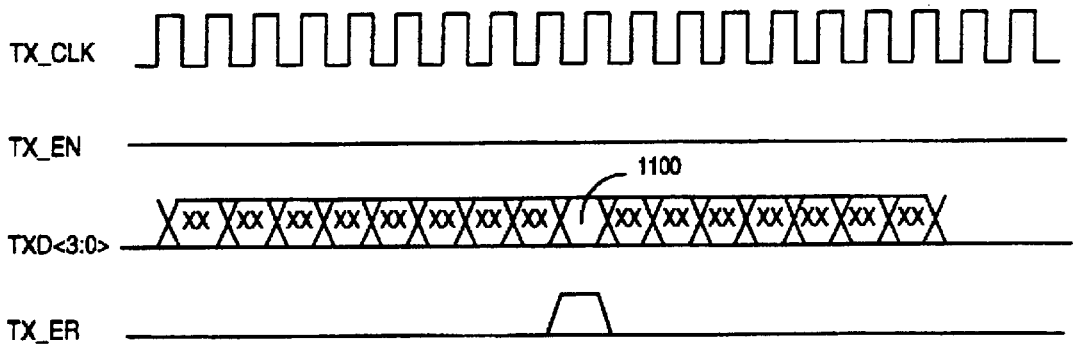
FIG. 3E depicts the spatial relationship between signals associated with transmission of a RELEASE message on MII', according to the present invention.

FIG. 3E depicts the spatial relationship between TX_CLK, TX_EN, TXD<3:0>, and TX_ER with respect to coding of a RELEASE ("1100") message on MII'. TX_EN="0" as what is shown is still the IPG period. Assertion of TX_ER from "1" to "1" during one TX_CLK cycle while "1100" is present on the data bundle results in generation of a RELEASE signal from the MAC to the physical layer. As noted, the physical layer de-asserts CRS, which enables MAC to transmit.

The RS 40' must ensure that flow control messages are only sent during the IPG or during the first nibble of the preamble. Messages may be sent when the following conditions are met:

$$TX_EN_{[t]}=0 \text{ OR } TX_EN_{[t-1]}=0.$$

Figure 3F:
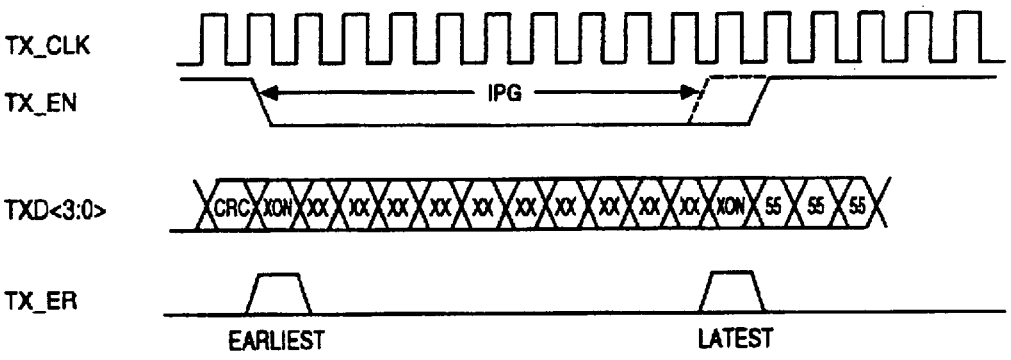
FIG. 3F depicts the spatial window during which valid flow control messages may be sent, according to the present invention.

FIG. 3F depicts this spatial relationship transporting flow control messages across MII' when emitting XON, XOFF, or RELEASE. Thus, FIG. 3E is relevant to both the refresh mode and time-out mode of generating flow control signals. In FIG. 3F, although XON is shown on TXD, in fact, XOFF or RELEASE could also have been shown. Two time windows for possible emission of a flow control signal are shown in FIG. 3F, denoted "earliest" and "latest".

In FIG. 3F, the earliest emission of a flow control signal is in the nibble time or clock period following the last nibble of a data frame. (A "nibble" is a four-bit unit of data that requires 25% of the nominal bit rate to be sent across the MII'.) The latest opportunity for sending a flow control message is overlapped with the first nibble of a data packet. This result occurs because the flow control messages are presumed emitted by an entity that is logically separate from the normal MAC transmit processes.

The present invention does not require changes to the MAC transmitting process to emit flow control messages, but instead assumes a parallel process logically separate from the MAC transmitting process. While this assumption promotes protocol compatibility, there is no correlation between sequencing of the MAC transmission processes and the state of the process that emits the flow control messages. Stated differently, the two processes neither know nor can predict each other's actions for the next TX_CLK cycle. Thus, the MAC could start transmitting a data packet when the process wishing to signal flow control begins to send XON, XOFF, or RELEASE. To avoid interference, the flow control generating process can monitor the state of TX_EN and if TX_EN is "0", or if it was de-asserted to "0" on the previous TX_CLK cycle, then a flow control message may be sent. But if TX_EN is asserted and was asserted on the previous TX_CLK cycle, then no flow control message can be sent. Thus, the process sending flow control messages must monitor TX_EN and may only send flow control messages when TX_EN is de-asserted, or when it was de-asserted during the previous TX_CLK signal.

Figure 3G:
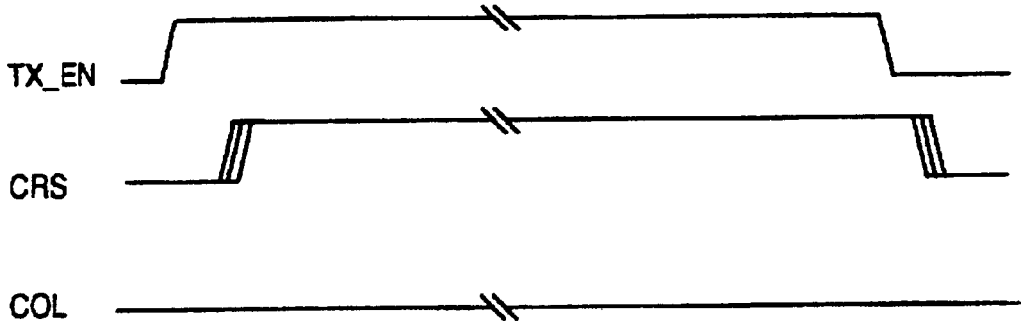
FIG. 3G depicts changes to MII' signal and CRS behavior during normal packet transmission, according to the present invention.

FIG. 3G depicts the response of the CRS and collision ("COL") signals in response to TX_EN during normal packet transmission.

TX_EN is generated by the MAC to the physical layer at the MII to indicate that a data frame is being transmitted, and the CRS and COL are signals from the physical layer to the MAC. CRS is asserted by the physical layer in response to the transmission. CRS remains asserted during transmission, and de-asserts after TX_EN de-asserts. The MAC defer process, a portion of a state machine associated with the MAC layer, begins time the IPG with the de-assertion of CRS. COL remains inactive or "0" at all times for a full-duplex environment.

By contrast, if FIG. 3G was associated with a half-duplex link, no simultaneous reception would be occurring. In half-duplex, the physical layer 30' asserts CRS during packet transmission or reception, whereas in full-duplex mode, the physical layer asserts CRS during packet transmission but not during packet reception. In full-duplex mode, the physical layer asserts CRS when an XOFF message is received from the remote end of the link, and continuously asserts CRS until an XON message is received from the remote end of the link, or until a RELEASE message is received from the local reconciliation layer 40'.

Figure 3H:
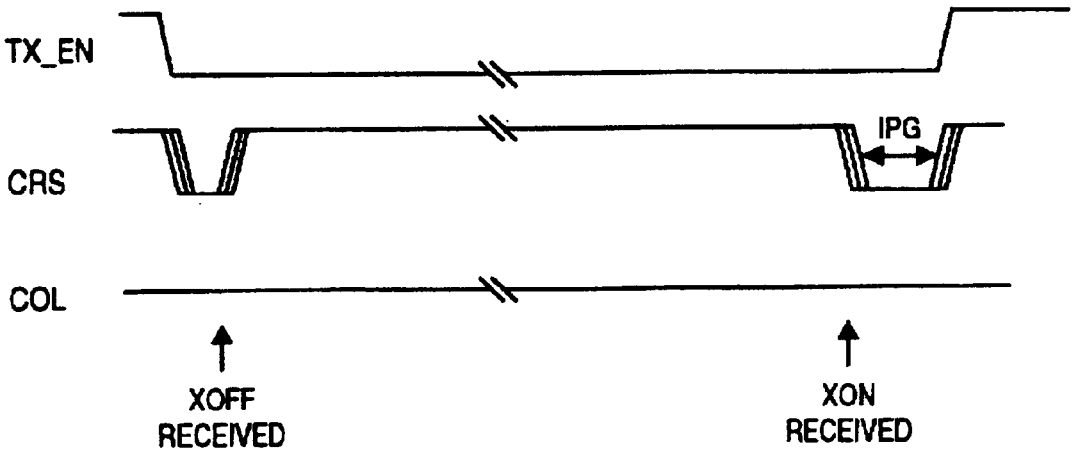
FIG. 3H depicts changes to MII' signal and CRS response behavior during XON/XOFF, according to the present invention.

FIG. 3H depicts response of the CRS and collision ("COL") signals in response to TX_EN in the presence of XOFF and XON signals. TX_EN is de-asserted at the normal end of a data frame transmission, whereupon CRS de-asserts in response. But in FIG. 3H, some time after CRS="0", the physically layer at the transmitting station receives an XOFF flow control signal from the congested receiving station at an end of the link. XOFF is decoded and in response CRS is re-asserted at the MII by the transmitting station, as shown in FIG. 3H. CRS stays active for an indeterminate period of time, during which time TX_EN is low because the transmitting MAC is deferring and will not transmit when CRS remains asserted. Later in FIG. 3H, an XON signal is received by the transmitting physical layer, which de-asserts CRS, whereupon the MAC may start transmitting. But the MAC will first time the IPG (96 bit times), and then begin transmitting, and assert TX_EN (if it has data to assert). The data to be sent is put onto the medium and the physical layer also asserts CRS.

Figure 3I:
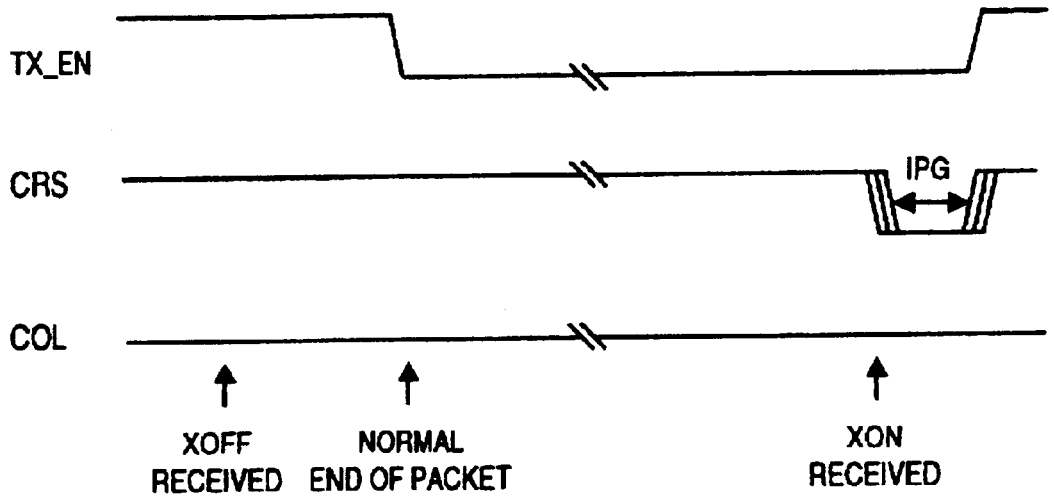
FIG. 3I depicts changes to MII' signal and CRS response when XOFF is received during packet transmission, according to the present invention.

FIG. 3I depicts the effect of receipt of an XOFF while a transmission is occurring, and demonstrates packet boundary granularity. MAC is transmitting a frame as shown by TX_EN="1", and CRS="1". Sometime into the frame transmission, an XOFF signal is received. The MAC continues to transmit, terminating the packet normally. But upon conclusion of frame transmission, instead of de-asserting CRS (as in FIG. 3G), CRS remains asserted because XOFF was received, and remains asserted until XON is received. After XON is received, after an IPG, CRS is re-asserted and the MAC can begin transmitting again.

Figure 3J:
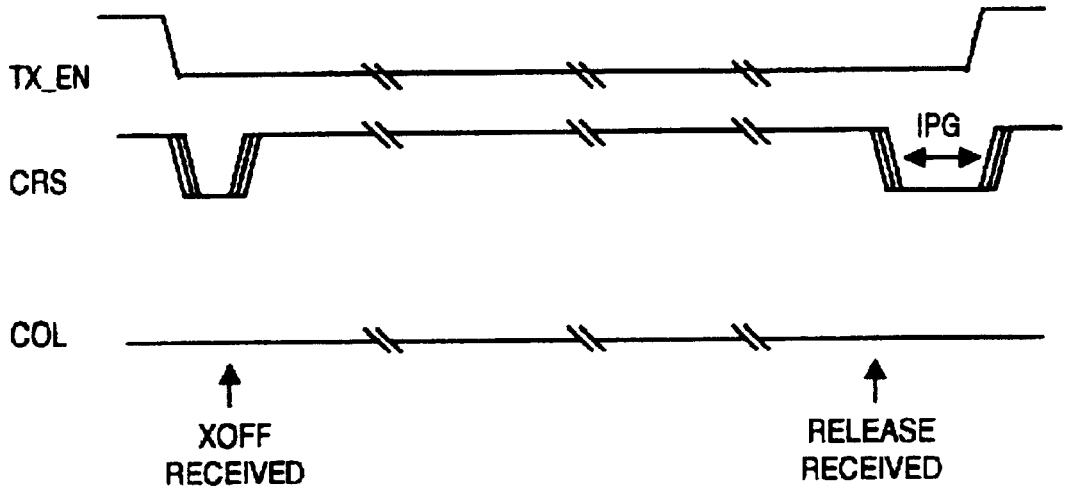
FIG. 3J depicts changes to MII' signal and CRS response in response to RELEASE, according to the present invention.

FIG. 3J depicts the response of the physical layer to a RELEASE message, and may be used if an XON message is somehow corrupted. The transmitting physical layer receives an XOFF message during transmission, which activates CRS for a relatively lengthy time period and inhibits the MAC from transmitting (e.g., deferral). The MAC continues to defer, no XON signal is received (perhaps due to signal corruption). After a period of time $\Delta T$, a RELEASE signal is received, which forces the physical layer to release or de-assert CRS, allowing the MAC to again transmit. The RELEASE message is encoded on the transmit path of the MII, forcing the physical to release CRS.

Figure 4:
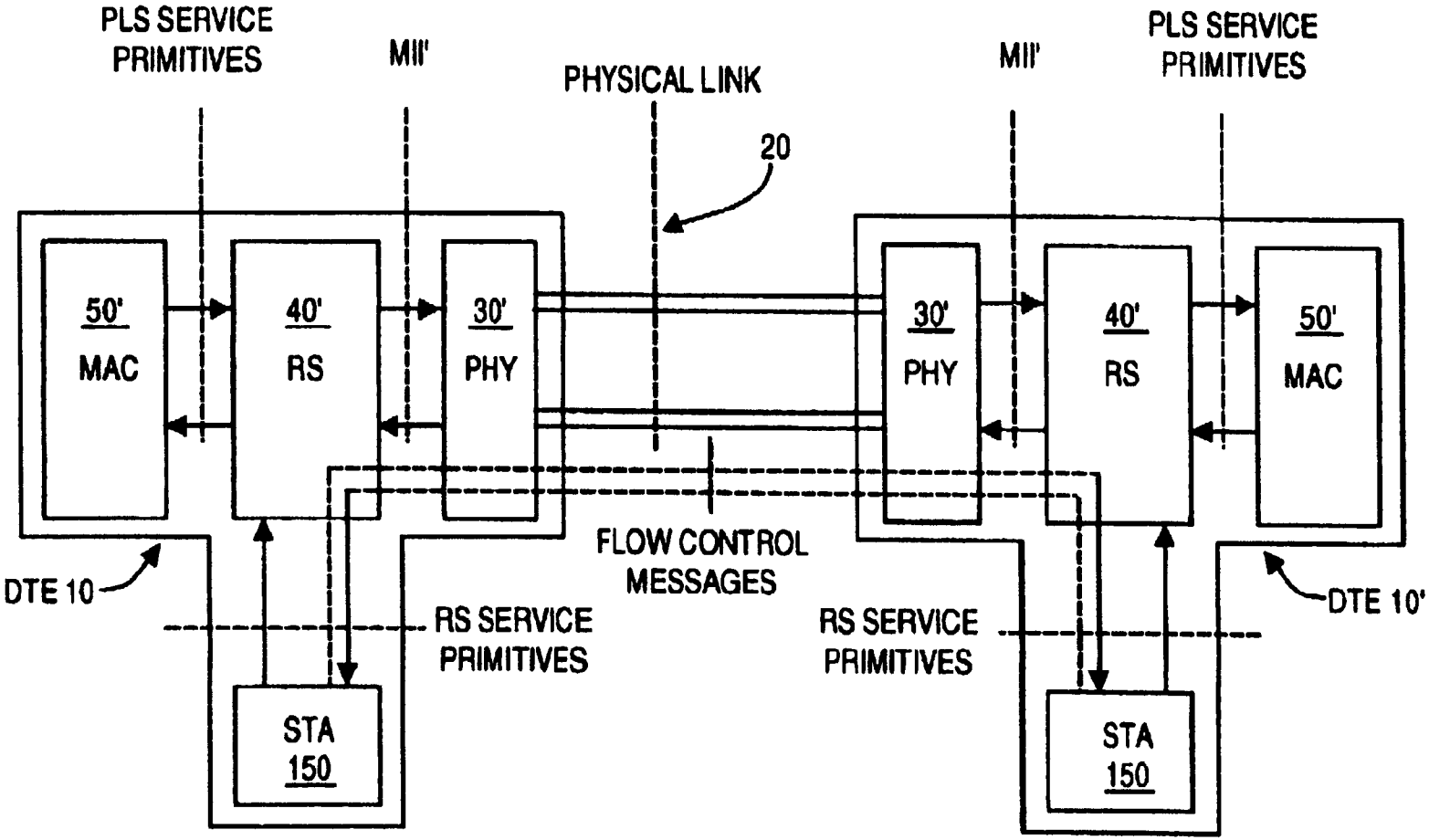
FIG. 4 depicts the role of the station management entity ("STA") within each DTE, according to the present invention.

It is important to appreciate that while XOFF was received from a remote (congested) station perhaps at the end of a link, the RELEASE signal is received from the near end of the link, namely from a station management entity ("STA") 150 in the transmitting station (see FIG. 4).

Turning now to FIG. 4, a first piece of data terminating equipment or DTE, e.g., computer 10, physical layer 30', interface MII', reconciliation sublayer 40', and MAC layer 50B is shown coupled to a second DTE, e.g., computer 10' and corresponding layers and sublayers. Each DTE includes a station management entity ("STA") 150, which essentially is a set of management or control functions within the station or computer. The STA becomes aware when station resources (e.g., memory) are in danger of congesting. For example, as a design choice it is useful to signal congestion and cause an XOFF control flow signal to issue when resources have no more than about one frame of data storage available, although other thresholds could instead be set.

In FIG. 4, the MII' interface, physical layer signal ("PLS") service primitives, reconciliation sublayer service primitives, and flow control messages are generally depicted, as is the physical link, e.g., cable 20, between the DTEs. The PLS service primitives are provided by the physical layer 30' to the media access control layer 5OB. As may be appreciated from FIG. 5, the reconciliation sublayer 40' functions to map the concrete signals defined by the MII' to the less concrete PLS service primitives.

For example, if a DTE STA 150 detects imminent resource congestion and wishes to emit a flow control signal (e.g., XOFF), the STA uses a RS STOP service primitive. The STA sends this primitive to RS 40', which encodes the primitive in MII'. The MII' then causes the associated physical layer 30' to emit the appropriate control flow signal, here XOFF.

It is important to appreciate from FIG. 4 that STA 150 is a separate and independent process from MAC 50B', and that no correlation exists between them. As a result, it is entirely possible that limited resources in computer 10' may result in its STA 150 determining that imminent congestion exists and that an XOFF signal must be transmitted, even though computer 10' may be ready to simultaneously transmit data. Thus, simultaneously a data packet from MAC

50B' and a flow control primitive from STA 150 could issue, both signal sets arriving as RS 40' simultaneously. Understandably, RS' will try to encode both signals simultaneously, but the result is that the physical layer 30' will transmit a garbled signal as it cannot discern the true data from the flow control signal. Thus, as was described with respect to FIG. 3F, the present invention creates a rule to avoid such overlap by specifying a window within which flow control primitives from MII' be encoded.

Figure 5:
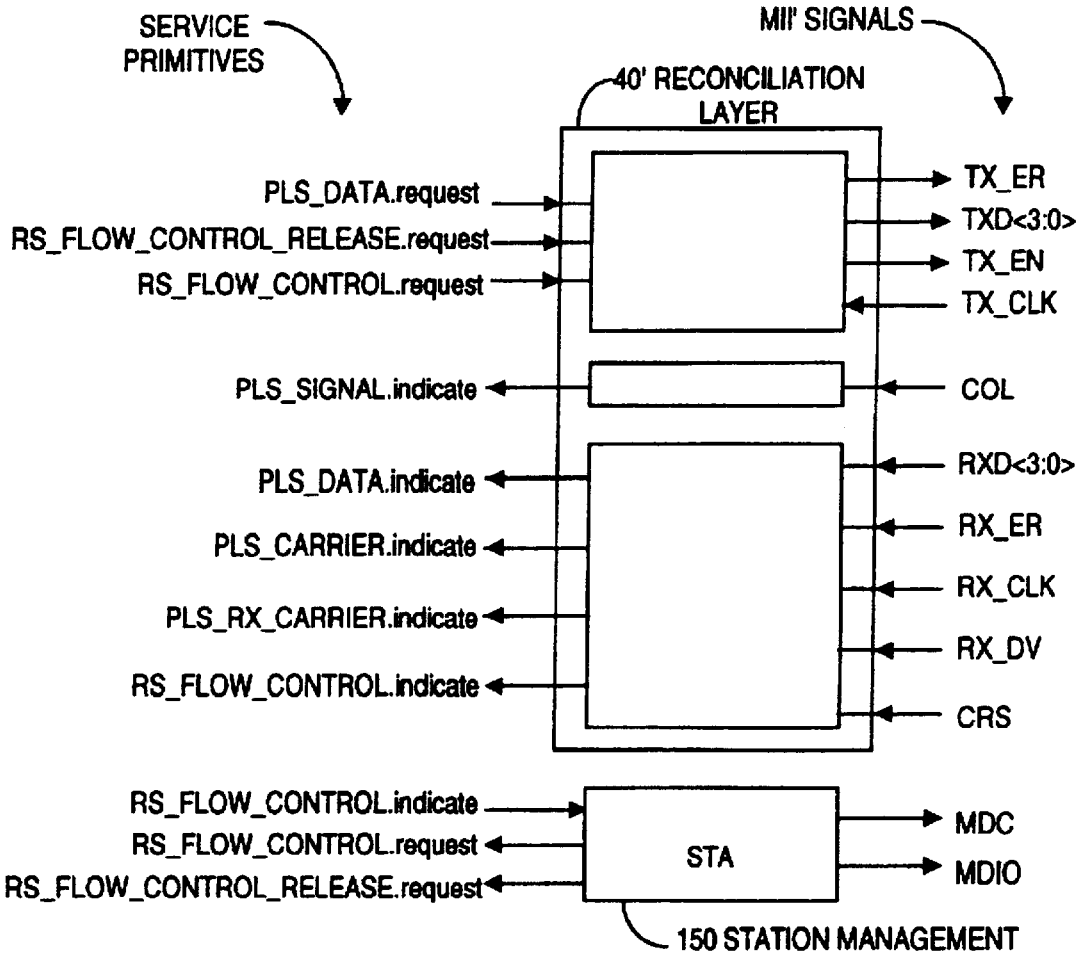
FIG. 5 depicts modifications to and the mapping role of the reconciliation sublayer, according to the present invention.

FIG. 5 will now be described with respect to changes to the MII' interface and the behavior of its associated signals. In FIG. 5 service primitives coupled to the reconciliation sublayer 40' include four new service functions, defined according to the present invention. Shown in bold type in FIG. 5, the new services are:

| | |
|---|---|
| RS_FLOW_CONTROL_RELEASE.request | (input) |
| RS_FLOW_CONTROL.request | (input) |
| PLS_RX_CARRIER.indicate | (output) |
| RS_FLOW_CONTROL.indicate | (output) |

These new reconciliation service layer primitives contain processes, only the most relevant of which are depicted in FIG. 5. The various service primitives shown on the left side of FIG. 5 are given in standard primitives language. The MII' signals on the right side of FIG. 5 reflect the MII' interface specification. The MII' specification is merely the definition of the behavior of a set of signals at the interface between physical layer 30' and reconciliation sublayer 40', and the MII' as such is not a functional entity. Thus, as modified according to the present invention, MII' defines an additional set of signal behaviors, e.g., the encoding of a transmit data bundle (TXD>3:0>) when flow control signals such as XON/XOFF are required, or the behavior of the physical layer 30' in terms of its handling of a CRS signal, and so forth. What is modified is the behavioral description of such signals, and how such signals may be used to achieve flow control in a full-duplex Ethernet environment, without data loss.

Figure 6:
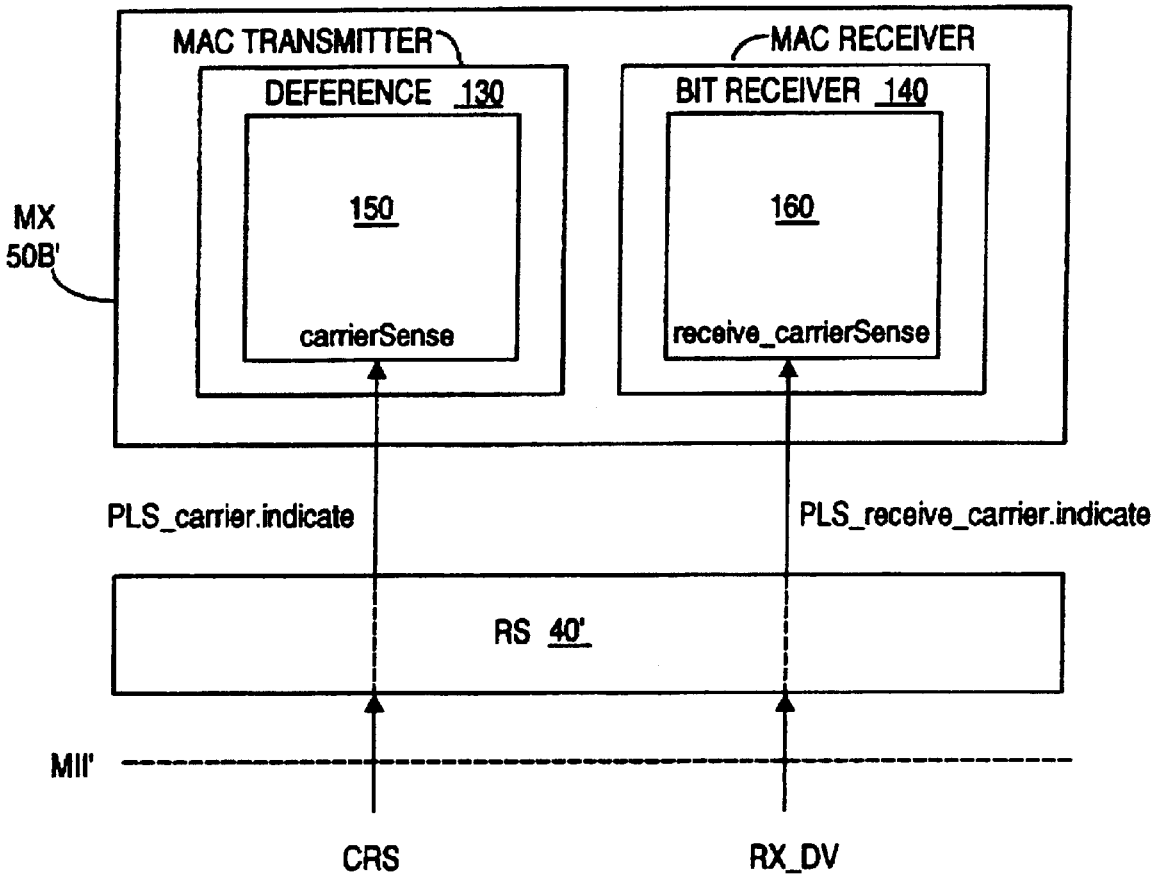
FIG. 6 depicts the modified media access layer ("MAC") and its receipt of independent and separately generated CRS and RX_DV signals, according to the present invention.

FIG. 6 depicts in further detail the duality aspect of the MAC 50B' layer according to the present invention. As noted, in half-duplex MAC layers, a single CRS input signal from the physical layer controlled the MAC layer transmitter process deferral and also the MAC layer receive process data framing. In stark contrast, a modified MAC layer 50B' according to the present invention separates these two processes and uses independent and separate input signals to control the deferral and data framing mechanisms.

As shown in FIG. 6, within MAC 50B', the transmitter process 130 includes a deference mechanism 150 that response to a carrier Sensesense signal, and the receiver process 140 includes a BirReceiver mechanism 160 that responds to a new variable, defined according to the present invention, receive_carrierSense signal. As shown, the receive_carrierSense variable may be derived directly from the MII' signal RX_DV, and is used to indicate incoming bits. (By contrast, in the prior art, a variable carrierSense was derived directly from the MII signal CRS and was used to indicate transmission deferral.)

In the preferred embodiment, separate CRS and RX_DV signals at MII' are provided to RS 40', which outputs among the various service primitives shown in FIG. 5, the PLS_carrier.indicate and PLS_receive_carrier.indicate primitives. The MAC 50B' receives these service primitives from which are provided as carrierSense and receive_carrierSense to the deference and BitReceiver mechanisms respectively. This separation of MAC carrierSense variables into carrierSense (used by deference 150) and receive_carrierSense (used by BitReceiver 160) is in contrast to the prior art.

For purposes of the present invention, it suffices that separate and independently generated signals give rise to carrierSense and receive_carrierSense within the modified MAC layer 50B'. Stated differently, it need not be required that CRS and RX_DV give rises to these signals. Regardless of how the separate and independently generated signals are created, in response the modified MAC layer 50B' performs separate deferral and data framing procedures similarly to what is accomplished for a half-duplex network using a MAC layer according to the prior art. Further, a modified MAC layer 50B' is fully backwards compatible with prior art networks that use the same CRS and RX_DV signals. The present invention slightly and semantically modified the 802.3 MAC standard as follows:

The interface to the physical layer is as follows, wherein bold type indicates newly added features, e.g., receive_carrierSense is a newly defined variable:

```
var
  receive_carrierSense: Boolean;{indicates incoming bits}
  carrierSense: Boolean; {indicates transmission deferral}
  transmitting: Boolean; {indicates outgoing bits}
  wasTransmitting: Boolean; {indicates transmission in progress}
  collisionDetect: Boolean; {Indicates medium contention}
procedure TransmitBit (bitparam: Bit);{Transmits one bit}
function ReceiveBit: Bit; {Receives one bit}
procedure Wait (bitTimes:integer); {Waits for indicate number
    of bit-times}
State Variable Initialization according to the present invention
    may be implemented as follows:
Procedure Initialize;
begin
  frameWaiting := false;
  deferring := false;
  newCollision := false;
  transmitting := false;
  receiving := false;
  while carrierSense or receive_carrierSense do nothing;
  {Start execution of all processes}
end; {Initialize}
```

Frame Reception preferably is implemented as follows:

```
process BitReceiver;
  var b: Bit;
begin
  cycle {outer loop}
    while receiving do
    begin {inner loop}
    if currentReceiveBit = 1 then
      PhysicalSignalDecap; {Strip off the preamble and
        start frame delimiter}
    b := ReceiveBit; {Get next bit from physical Media
        Access }
    if receive_carrierSense then
    begin {append bit to frame}
        incomingFrame{currentReceiveBit := b;
        currentReceiveBit := currentReceiveBit + 1
      end {append bit to frame}
      receiving := receive_carrierSense
    end {inner loop}
    frameSize := currentReceiveBit − 1
  end {outer loop}
end; {BitReceiver}
```

The present invention makes slight modification to the reconciliation sublayer as follows:

As shown in FIG. 6, PLS_RX_CARRIER.indicate (CARRIER_STATUS) will map the MII' signal RX_DV to the MAC variable receive_carrierSense, and PLS_CARRIER.indicate (CARRIER_STATUS) will map the MII' signal CRS to the MAC variable carrierSense.

RS_FLOW_CONTROL.request (REQUEST_TYPE) is generated by the STA to the reconciliation sublayer, and the REQUEST_TYPE parameter can take one of two values: STOP and START. Upon receipt of this primitive, the reconciliation sublayer maps the STOP and START values to messages on the MII' as follows:

STOP→XOFF

START→XON

In the present invention, RS_FLOW_CONTROL.indicate (INDICATE_TYPE) is generated by the reconciliation sublayer to the STA. The INDICATE_TYPE parameter can take one of two values:

STOP and START

The reconciliation sublayer generates this primitive by decoding messages from MII and mapping them as follows:

XOFF→STOP

XON→START

The RS_FLOW_CONTROL_RELEASE.request() primitive is generated by the STA to the reconciliation sublayer and takes no parameters. Upon receipt of this primitive, the reconciliation sublayer generates a RELEASE message on the MII'.

To recapitulate, it will be appreciated from all of the foregoing, that the present invention implements flow control in a full-duplex Ethernet environment, while preserving backward compatibility with existing environments and hardware. Flow control is provided using a slightly modified MII' signal set, with minor changes to the MAC layer 50B', with minor additions to the reconciliation sublayer 40' and with minor changes to the physical layer 30'.

The present invention provides deferral and data framing preferably using two independently generated signals. The resultant flow control is lossless and permits a reduced data rate equal to the date rate of the slower resource whose imminent congestion gives rise to the flow control. In short, link level flow control for full-duplex Ethernet networks may be implemented in a simple and cost-effective fashion, while maintaining backward compatibility.

Modifications and variations may be made to the disclosed embodiments without departing from the subject and spirit of the invention as defined by the following claims.

What is claimed is:

1. A flow control method for use with a full-duplex Ethernet network that includes at least a first [station] *endstation* coupled by a medium to a second [station] *endstation* for transmission of signals therebetween, each [station] *endstation* definable as including at least a physical layer and a reconciliation sublayer and a media independent interface (MII) therebetween, and a media access control layer, the method including the following steps:

(a) when resources of said second [station] *endstation* approach a threshold level of congestion, causing said second [station] *endstation* to periodically transmit a first flow control (XOFF) signal over said medium to said first [station] *endstation*, and causing said second [station] *endstation* to periodically transmit a second flow control (XON) signal otherwise over said medium to said first [station] *endstation*, said XOFF signal and said XON signal being distinguishable from data signals transmittable over said medium;

(b) upon receipt of a said XOFF flow control signal, causing said first [station] *endstation* to continuously assert a carrier sense (CRS) signal *to the media access control layer of said first endstation* until receipt by said first [station] *endstation* of a control signal commanding de-assertion of said CRS flow control signal;

wherein assertion of said CRS continues for a time period not exceeding receipt by said first [station] *endstation* of a said XON signal from said second [station] *endstation*;

wherein during assertion of said CRS flow control signal, said first [station] *endstation* is flow controlled.

2. The method of claim 1, wherein at step (b), said physical layer of said first [station] *endstation* receives, decodes, and recognizes a said flow control signal, and wherein recognition of a said XOFF flow control signal results in said physical layer of said first [station forcing] *endstation asserting said CRS signal to force* said media access control layer of said first [station] *endstation* to defer further transmission until for a time interval not exceeding transmission by said second [station] *endstation* of a subsequently transmitted said XON control signal.

3. The method of claim 1, wherein at step (b), upon receipt, decoding and recognition of a said flow control signal, said physical layer of said first [station forces] *endstation asserts said CRS signal to force* said media access control layer of said first [station] *endstation* to defer until the earlier occurrence of receipt of a said XON control signal or a [said] time-out signal.

4. The method of claim 1, wherein:

said MII interface provides data transmission paths including transmit data (TXD<3:0>), transmit clock (TX_CLK), transmit enable (TX_EN), and transmit error (TX_ER), and provides reception paths including receive data (RXD<3:0>), receive clock (RX_CLK), receive data valid (RX_DV), and receive error (RX_ER), and provides asynchronous media status signals including carrier sense (CRS) and collision (COL), and further provides a management interface for control and status gathering including management data clock (MDC) and management data input/output (MDIO);

said TX_CLK is continuously active, said RX CLK is continuously active during reception by said second [station] *endstation* of data from said first [station] *endstation*, and during an inter-packet gap (IPG); and transmission and reception of data by a said [station] *endstation* is uninterrupted [with] *within* a protocol data unit (PDU).

5. The method of claim 1, wherein at step (a), a said [station] *endstation* initiates transmission of a said XON or XOFF signal using a primitive RS_FlowControl.request (request_type), wherein request_type:START,STOP.

6. The method of claim 1, wherein at step (b), a said [station] *endstation* receives a said XON or XOFF signal using a primitive RS_FlowControl.indicate(indicate_type[_], wherein indicate_type:START,STOP.

7. The method of claim 1, wherein at step (b), a said [station] *endstation* recovers from non-receipt of a transmitted said XON signal using a primitive RS_FlowControl_Release.request().

8. The method of claim 1, wherein at step (a), a said [XOFF/flow] *XOFF flow* control signal is produced by said reconciliation layer in said second [station] *endstation* in response to a stop flow control request service primitive (RS_FlowControl.request(STOP)), and is conveyed on said MII interface of said second [station] *endstation* in one receive clock (RX_CLK) period as a transmit data signal (<TXD<3:0>=<pattern1>, a de-asserted transmit enable signal (TX_EN), and an asserted transmit error signal (TX_ER)), wherein <pattern1> is a bit pattern representing a said XOFF flow control signal.

9. The method of claim 1, wherein at step (a), a said XON flow control signal is produced by said reconciliation layer in said second [station] *endstation* in response to a start flow control request service primitive (RS_FlowControl.request (START)), and is conveyed on said MII interface of said second [station] *endstation* in one transmit clock (TX_CLK) period as a transmit data signal (<TXD<3:0>=<pattern2>, a de-asserted transmit enable signal (TX_EN), and an asserted transmit error signal (TX_ER)), wherein <pattern2> is a bit pattern representing a said XON flow control signal.

10. The method of claim 1, wherein said physical layer of said first [station] *endstation* upon receipt of a said XOFF signal from said second [station] *endstation* issues an XOFF signal to said reconciliation layer of said first [station] *endstation* that is conveyed on said MII interface as [as] *a* receive data signal (RXD<3:0>=<pattern1>, a de-asserted receive data valid signal (RX_DV), and an asserted receive error signal (RX_ER)), wherein said pattern1 is a bit pattern representing a said XOFF flow control signal.

11. The method of claim 1, wherein said physical layer of said first [station] *endstation* upon receipt of a said XON signal from said second [station] *endstation* issues an XON message to said reconciliation layer of said first [station] *endstation* that is conveyed on said MII interface as a receive data signal (RXD<3:0>=<pattern2>, a de-asserted receive data valid signal (RX_DV), and an asserted receive error signal (RX_ER)), wherein said pattern2 is a bit pattern representing a said XON flow control signal.

12. The method of claim 1, wherein said reconciliation layer of said first [station] *endstation* issues a RELEASE message in response to an RS_FlowControl_Release.request() primitive, said RELEASE message being conveyed on said MII interface as a transmit data signal (TXD<3:0>=<pattern3>, a de-asserted transmit enable signal (TX_EN), an asserted transmit error signal (TX_ER)), wherein said pattern3 is a bit pattern representing a said RELEASE signal.

13. The method of claim 1, wherein at least an appropriate one of said XON control signal and said XOFF flow control signal is transmitted during at least one inter-packet gap (IPG).

14. The method of claim 1, wherein at least an appropriate one of said XON control signal and said XOFF flow control signal is transmitted during a first-half of preamble associated with a frame of data transmitted over said medium.

15. The method of claim 1, wherein at least an appropriate one of said XON control signal and said XOFF flow control signal is transmitted during each inter-packet gap (IPG).

16. The method of claim 1, wherein said flow control is lossless.

17. The method of claim 1, wherein at least said first [station] *endstation* further includes a timer that, upon receipt by said first [station] *endstation* of a said XOFF control signal from said second [station] *endstation*, generates a time-out interval after which said first [station] *endstation* de-asserts said CRS signal even if a said XON signal has not been received by said first [station] *endstation* from said second [station] *endstation*.

18. The method of claim 1, wherein said network is IEEE [802] *802.3*-compliant, and said first [station] *endstation* and said second [station] *endstation* are identical.

19. The method of claim 1, wherein a said [station] *endstation* includes a said media access layer having a transmitter process including a deference mechanism responsive to a carrier sense signal (CRS) from said physical layer of said [station] *endstation*, and wherein said media access layer further has a receiver process including a bit receiver mechanism framing data responsive to a receive data valid (RX_DV) from said physical layer of said [station] *endstation*.

*20. A method for providing full duplex flow control in a full duplex Ethernet network, comprising:*

*receiving a flow control signal at a source station;*

*responsive to receiving the flow control signal, starting a timer having an expiration time, wherein said timer is implemented in a medium access control layer of said source station; and*

*delaying transmission from said source station until at least the expiration time;*

*wherein said timer is a timer other than a back-off timer applied after a collision.*

*21. The method of claim 20, wherein the flow control signal is compliant with an IEEE 802.3 pause command.*

*22. A method for providing full duplex flow control in a manner operable with an IEEE 802.3 standard, comprising:*

*at a transmitting endstation, receiving a first flow control signal from a destination endstation, wherein the first flow control signal is compliant with the IEEE 802.3 standard; and*

*responsive to receiving the first flow control signal, delaying transmission for a predetermined period of time measured by a timer managed by a medium access control layer of the transmitting endstation.*

*23. The method of claim 22, further comprising:*

*responsive to receiving a second flow control signal compliant with the IEEE 802.3 standard, re-starting transmission.*

*24. A method for providing full duplex flow control in a manner operable with an IEEE 802.3 standard, comprising:*

*at a transmitting endstation, deferring transmission during a period of time measured by a timer maintained by a medium access control layer of the transmitting endstation;*

*receiving a flow control signal from a destination endstation, wherein the flow control signal is compliant with the IEEE 802.3 standard; and*

*responsive to receiving the flow control signal, resuming transmission from the transmitting endstation.*

*25. A flow control method for use with a full duplex Ethernet network that includes at least a source endstation coupled by a medium to a destination endstation for transmission of signals therebetween, comprising:*

*establishing a communication connection between the source endstation and the destination endstation for the purpose of exchanging data;*

*upon receipt of a transmit off message at the source endstation from the destination endstation, pausing the transmission of data from the source endstation; and*

*resuming the transmission of data from the source endstation upon expiration of a timer maintained in a medium access control (MAC) layer of the source endstation.*

*26. A flow control method for use with a full duplex Ethernet network that includes at least a source station*

*coupled by a medium to a destination station for transmission of signals therebetween, comprising:*

*receiving a pause command from a destination station at a source station; and*

*halting the transmission of data from the source station to the destination station until one of:*

*an expiration of a given time measured by a medium access control layer of the source station; and*

*receipt of a resume command from the destination station.*

*27. The method of claim 20, further comprising:*

*responsive to receiving a second flow control signal prior to the expiration time, re-starting transmission.*

*28. A method of performing flow control between a first communication endstation and a second communication endstation, comprising:*

*establishing a communication connection between a first endstation and a second endstation;*

*receiving a first flow control signal at the first endstation from the second endstation;*

*in response to said first flow control signal, asserting a Carrier Sense (CRS) signal toward a medium access control (MAC) layer in the first endstation to defer transmission from the first endstation to the second endstation; and*

*de-asserting said CRS signal in response to one of:*

*a second flow control signal from the second endstation; and*

*expiration of a timer initiated in response to said first flow control signal.*

*29. A method of applying flow control between endstation in a communication network, comprising:*

*establishing a communication connection between a first endstation and a second endstation in a communication network in order to exchange data;*

*transmitting one or more communication units from the first endstation to the second endstation;*

*receiving at the first endstation a first flow control signal from the second endstation;*

*initiating, in a medium access control (MAC) layer of the first endstation, a delay timer; and*

*delaying transmission of a next communication unit from the first endstation to the second endstation until one of:*

*said delay timer expires; and*

*a second flow control signal countermanding said first flow control signal is received at the first endstation from the second endstation.*

* * * * *

UNITED STATES PATENT AND TRADEMARK OFFICE

CERTIFICATE OF CORRECTION

PATENT NO. : RE 38,309 E
DATED : November 11, 2003
INVENTOR(S) : Frazier et al.

It is certified that error appears in the above-identified patent and that said Letters Patent is hereby corrected as shown below:

Column 16,
Line 46, replace “RX CLK” with -- RX_CLK --;
Line 60, replace “type” with -- type) --;

Column 20,
Line 6, replace “endstation” with -- endstations --.

Signed and Sealed this

Thirtieth Day of December, 2003

JAMES E. ROGAN
*Director of the United States Patent and Trademark Office*